（12） United States Patent
Bergquist

(10) Patent No.: US 8,834,314 B2
(45) Date of Patent: Sep. 16, 2014

(54) METHOD AND DEVICE FOR REGENERATIVE BRAKING FOR A VEHICLE

(75) Inventor: Mikael Bergquist, Huddinge (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 14/129,384

(22) PCT Filed: Jun. 18, 2012

(86) PCT No.: PCT/SE2012/050665
§ 371 (c)(1),
(2), (4) Date: Dec. 26, 2013

(87) PCT Pub. No.: WO2013/002705
PCT Pub. Date: Jan. 3, 2013

(65) Prior Publication Data
US 2014/0128193 A1    May 8, 2014

(30) Foreign Application Priority Data
Jun. 27, 2011 (SE) ..................... 1150590

(51) Int. Cl.
F16H 3/44 (2006.01)
B60K 6/48 (2007.10)
(Continued)

(52) U.S. Cl.
CPC ............. *F16H 3/72* (2013.01); *B60Y 2400/421* (2013.01); *B60Y 2400/4244* (2013.01); *B60K 2006/381* (2013.01); *F16H 2200/2005* (2013.01); *B60K 6/38* (2013.01); *B60Y 2400/408* (2013.01); *B60K 6/48* (2013.01); *B60K 2006/4825* (2013.01); *F16H 3/724* (2013.01); *Y02T 10/6221* (2013.01); *B60K 6/387* (2013.01); *B60K 6/547* (2013.01); *Y10S 903/902* (2013.01); *B60K 6/365* (2013.01); *Y02T 10/6252* (2013.01); *Y10S 903/91* (2013.01)
USPC ................ 475/312; 475/8; 903/910; 903/902

(58) Field of Classification Search
USPC ............. 475/4, 5, 8, 149, 296, 297, 311, 312; 903/910, 917, 918, 946; 180/65.235, 180/65.25, 65.6
See application file for complete search history.

(56) References Cited

U.S. PATENT DOCUMENTS 6,595,340 B2 *  7/2003  Moorman et al. .......... 192/85.25
8,684,875 B2 *  4/2014  Kaltenbach et al. ............. 475/5
(Continued)

FOREIGN PATENT DOCUMENTS

DE    10 2006 059 005 A1    7/2008
DE    10 2008 011 080 A1    8/2009
(Continued)

OTHER PUBLICATIONS

International Preliminary Report on Patentability dated Sep. 26 2013 issued in corresponding International patent application No. PCT/SE2012/050665.

(Continued)

*Primary Examiner* — Justin Holmes
(74) *Attorney, Agent, or Firm* — Ostrolenk Faber LLP

(57) ABSTRACT

A regenerative brake device for a vehicle includes an output shaft (14) of a combustion engine (4), an input shaft (27) of a gearbox (8), an electrical machine (6) having a stator (24) and a rotor (26), and a planetary gear (10) which comprises a sunwheel (18), a ring gear (20) and a planet wheel carrier (22). The engine output shaft (14) is disconnectably connectable to the planetary gear (10) by a movable piston (16) which in a first position connects the engine output shaft (14) to the planetary gear (10) and in a second position disconnects the gearbox input shaft from the planetary gear. Also a method for regenerative braking of a vehicle (1) for such a regenerative brake device (2) is disclosed.

10 Claims, 5 Drawing Sheets

(51) Int. Cl.
  *B60K 6/387* (2007.10)
  *B60K 6/547* (2007.10)
  *B60K 6/365* (2007.10)
  *B60K 6/38* (2007.10)
  *F16H 3/72* (2006.01)

(56) References Cited

U.S. PATENT DOCUMENTS

| | | | | |
|---|---|---|---|---|
| 8,702,546 | B2 * | 4/2014 | Kaltenbach et al. | 475/5 |
| 2008/0236917 | A1 * | 10/2008 | Abe et al. | 180/65.4 |
| 2009/0288895 | A1 | 11/2009 | Klemen et al. | |
| 2010/0173746 | A1 | 7/2010 | Ideshio et al. | |
| 2011/0132675 | A1 | 6/2011 | Braun | |
| 2012/0115677 | A1 | 5/2012 | Sakai et al. | |

FOREIGN PATENT DOCUMENTS

| | | |
|---|---|---|
| EP | 1 225 370 A2 | 7/2002 |
| EP | 2 407 363 A1 | 1/2012 |
| EP | 2 436 546 A1 | 4/2012 |
| FR | 2 833 538 A1 | 6/2003 |

OTHER PUBLICATIONS

International Search Report dated Apr. 9, 2013 issued in corresponding International patent application No. PCT/SE2012/050665.

* cited by examiner

METHOD AND DEVICE FOR REGENERATIVE BRAKING FOR A VEHICLE

CROSS-REFERENCE TO RELATED APPLICATIONS

The present application is a 35 U.S.C. §§371 national phase conversion of PCT/SE2012/050665, filed Jun. 18, 2012, which claims priority of Swedish Patent Application No. 1150590-6, filed Jun. 27, 2011, the contents of which are incorporated by reference herein. The PCT International Application was published in the English language.

BACKGROUND TO THE INVENTION AND PRIOR ART

The present invention relates to a regenerative brake device for a vehicle and to a method for regenerative braking of a vehicle.

Hybrid vehicles may be powered by a primary prime mover which may be a combustion engine, and by a secondary prime mover which may be an electrical machine. The electrical machine will be equipped with at least one battery to store electrical energy and with regulating equipment to regulate the flow of electrical energy between the battery and the electrical machine. The electrical machine may thus serve alternately as motor and generator, depending on the vehicle's operating state. When the vehicle is braked, the electrical machine generates electrical energy which is then stored in the battery. This is usually called regenerative braking, which means that the vehicle is braked by means of the electrical machine and the combustion engine. The stored electrical energy is subsequently used for operation of the vehicle.

Using a conventional clutch mechanism which disconnects the gearbox input shaft from the engine during gearchange processes in the gearbox involves disadvantages, e.g. warming of the clutch mechanism's discs, resulting in greater fuel consumption and in clutch disc wear. In addition, a conventional clutch mechanism is relatively heavy and expensive. It also occupies a relatively large amount of space in the vehicle.

Connecting the engine output shaft, the electrical machine's rotor and the gearbox input shaft to a planetary gear makes it possible to dispense with the conventional clutch mechanism. In regenerative braking of the vehicle, however, the planetary gear will cause the regenerative braking torque of the electrical machine to be reduced because the engine's braking torque on the planetary gear will not be sufficient. In particular, during powerful regenerative braking with the electrical machine the engine's speed will increase undesirably.

Specification US-A1-2009/0288895 refers basically to how a ring gear in a planetary gear connected to an engine can be locked in a housing which is stationary relative to the planetary gear in order to effect regenerative braking of a vehicle by means of an electrical machine. The engine can be disconnected from the planetary gear's ring gear.

The space available for the propulsion device in a vehicle is often limited. If the propulsion device comprises a plurality of components, e.g. a combustion engine, an electrical machine, a gearbox and a planetary gear, the configuration needs to be compact. If further components, e.g. a regenerative brake device, are involved, this makes it still more necessary for the components of the propulsion device to be of compact configuration.

The components of the propulsion device are also required to be of high reliability and high operational safety.

SUMMARY OF THE INVENTION

The object of the present invention is to propose a regenerative brake device which is of compact construction.

A further object of the invention is to propose a regenerative brake device which is of high reliability and high operational safety.

These objects are achieved with the regenerative brake device of the invention.

These objects are also achieved with a method for regenerative braking of a vehicle with a regenerative brake device of the kind herein with the features herein.

The engine output shaft is disconnectably connected to the planetary gear by a movable piston which in a first position connects the engine output shaft to the planetary gear and in a second position disconnects the engine output shaft from the planetary gear. This results in a compact configuration with few components and has the further consequence that the brake device is of high reliability and high operational safety.

According to an embodiment of the invention, the piston takes the form of an annular sleeve which substantially concentrically surrounds a portion of the engine output shaft and a portion of the planetary gear. As both the engine output shaft and said portion of the planetary gear are surrounded by the piston, the result is a compact configuration.

According to a further embodiment, the aforesaid portions of the engine output shaft and the planetary gear are provided with splines which in the piston's first position cooperate with splines on the piston to form a splined connection, and the piston is movable along the engine output shaft and the planetary gear. Such a splined connection results in a compact configuration with high reliability and high operational safety.

According to a further embodiment, the piston in a third position acts upon a connecting means which connects the planetary gear to an element which is fixed relative to the planetary gear. The piston has also the function of acting upon a connecting means between the planetary gear and an element which is fixed relative to the planetary gear which reduces the number of components, thereby reducing the size of the configuration and increasing its reliability and operational safety.

According to a further embodiment, the connecting means is a disc clutch. A disc clutch not only connects the components strongly together but also makes it possible to limit their size, resulting in a compact configuration.

According to a further embodiment, the piston is moved by compressed air acting upon a surface of the piston. Controlling the piston by compressed air results in high reliability and high operational safety.

According to a further embodiment, the engine output shaft is disconnectably connected to the planetary gear's sunwheel and they have a common axis of rotation. This results in a compact configuration.

According to a further embodiment, the engine output shaft, the electrical machine's rotor and the gearbox input shaft are arranged for rotation about a common axis of rotation. Such a configuration makes it possible for the components to be situated close together, resulting in a compact configuration.

A planetary gear usually comprises three components arranged for rotation relative to one another, viz. a sunwheel, a planet wheel carrier and a ring gear. Knowing the number of teeth which the sunwheel and the ring gear have makes it possible to determine during operation the rotation speeds of the three components. According to the present invention, one of the planetary gear's components is connected to an output shaft of the engine. This component of the planetary gear therefore rotates at a speed corresponding to that of the engine output shaft. A second component of the planetary gear is connected to an input shaft of the gearbox. This component of the planetary gear therefore rotates at the same speed as the gearbox input shaft. A third component of the planetary gear is connected to a rotor of an electrical machine. This component of the planetary gear therefore rotates at the same speed as the electrical machine's rotor if they are connected directly to one another. Alternatively, the electrical machine may be connected to the third component of the planetary gear via a transmission which has a gear ratio, in which case the electrical machine and the third component of the planetary gear may rotate at different speeds. The speed of electrical machines can be regulated steplessly. In operating situations where a desired speed is to be imparted to the gearbox input shaft, a control unit uses knowledge of the engine's speed to calculate the speed at which the third component has to be driven for the gearbox input shaft to run at the desired speed. A control unit activates the electrical machine so that it imparts the calculated speed to the third component and hence the desired speed to the gearbox input shaft.

BRIEF DESCRIPTION OF THE DRAWINGS

A preferred embodiment of the invention is described below by way of example with reference to the attached drawings, in which.

DETAILED DESCRIPTION OF AN EMBODIMENT OF THE INVENTION

Figure 1:
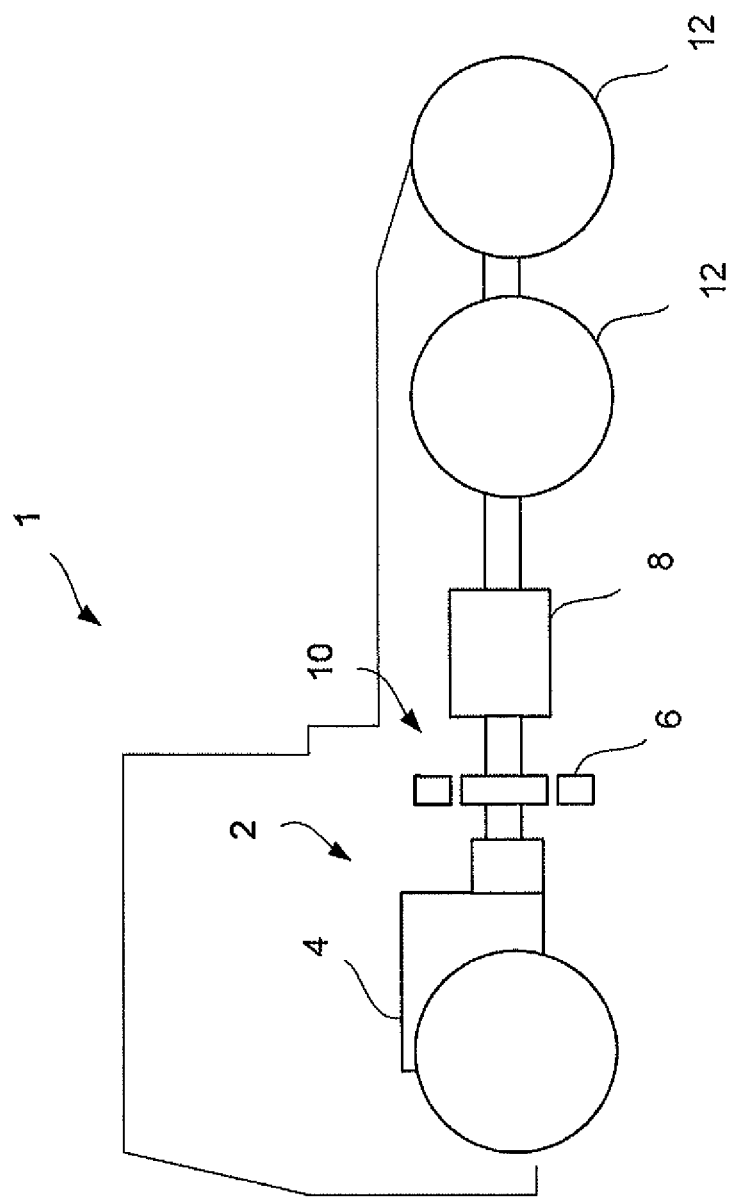
FIG. 1 is a side view of a vehicle with a regenerative brake device according to the present invention.

FIG. 1 is a side view of a vehicle 1 provided with a regenerative brake device 2 according to the present invention. A combustion engine 4 is connected to an electrical machine 6 and a gearbox 8 via a planetary gear 10. The gearbox is also connected to the vehicle's powered wheels 12.

Figure 2:
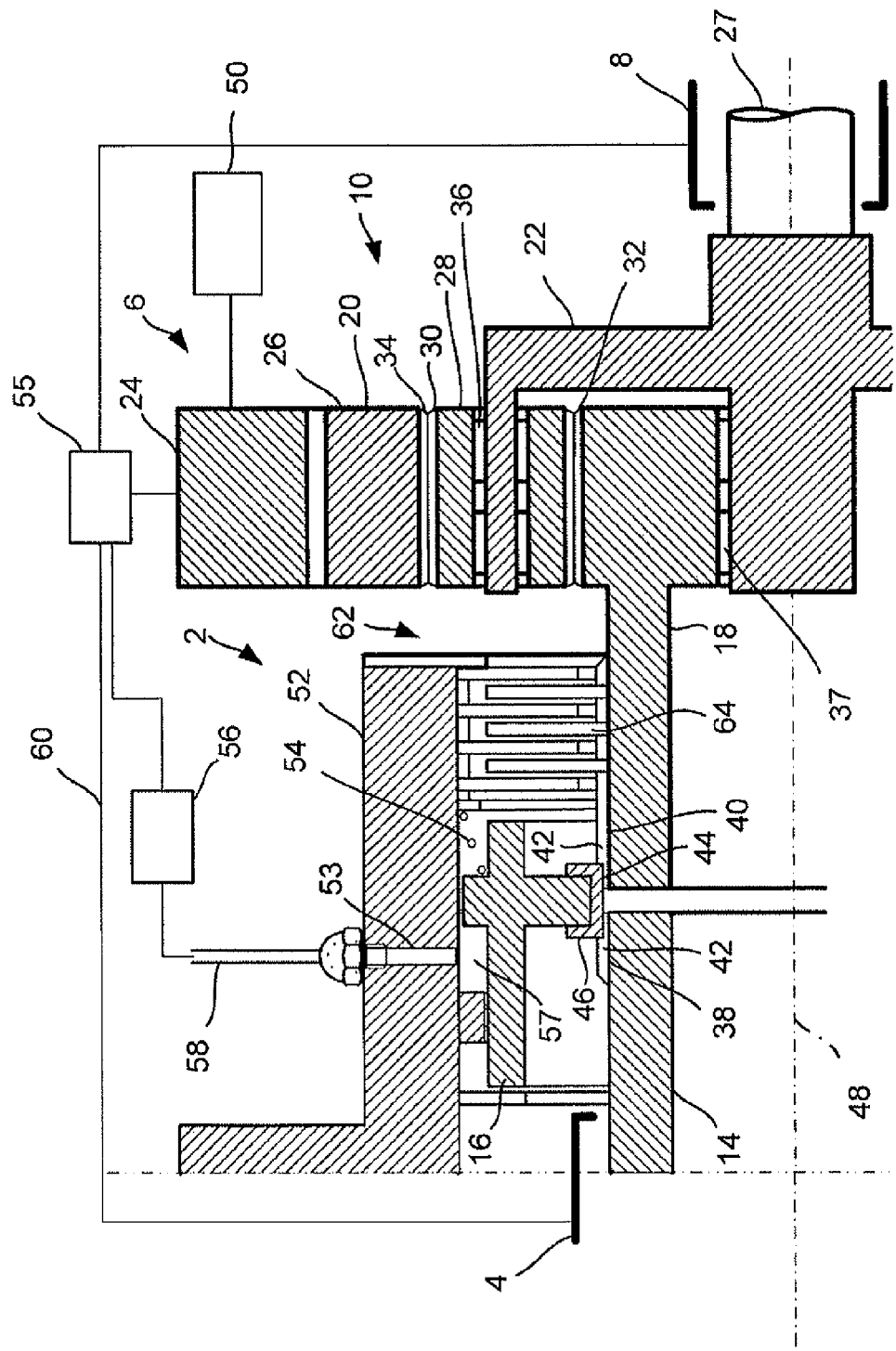
FIG. 2 is a cross-sectional view of the regenerative brake device according to the present invention with a piston in a first position.

FIG. 2 is a cross-sectional view of the regenerative brake device 2 according to the present invention. An output shaft 14 of the engine 4 is disconnectably connected to the planetary gear 10 by a movable piston 16 which in a first position connects the engine output shaft 14 to the planetary gear 10.

The planetary gear 10 comprises a sunwheel 18, a ring gear 20 and a planet wheel carrier 22. In the embodiment depicted, the sunwheel 18 is connected to the engine output shaft 14 via the movable piston 16. It is also possible to connect the engine output shaft 14 to the ring gear 20 or the planet wheel carrier 22 via the movable piston 16.

The electrical machine 6 comprises a stator 24 and a rotor 26. The stator is firmly connected to the vehicle and therefore does not rotate. The rotor is connected to the planetary gear's ring gear 20 and can therefore rotate relative to the stator. In the embodiment example depicted, the ring gear 20 and the electrical machine's rotor 26 form a composite unit but it is also possible for them to be separate units connected to one another.

An input shaft 27 of the gearbox 8 is connected to the planet wheel carrier 22 which comprises a number of gearwheels referred to as planet wheels 28 which are supported on the planet wheel carrier by, for example, rolling bearings 36. In the embodiment depicted, the sunwheel 18 is likewise supported on the planet wheel carrier by rolling bearings 37. The teeth 30 of the planet wheels 28 engage with respective teeth 32, 34 on the sunwheel 18 and the ring gear 20.

The piston 16 takes the form of an annular sleeve which substantially concentrically surrounds a portion 38 of the engine output shaft 14 and a portion 40 of the sunwheel 18. Said portions 38, 40 of the engine output shaft 14 and the sunwheel 18 are provided with splines 42 which in the piston's first position cooperate with splines 44 on the piston to form a splined connection. In the embodiment depicted, a circumferential socket 46 is placed on the piston 16 and is provided with splines 44 which cooperate with the splines 42 on the engine output shaft 14 and the sunwheel 18. The splines 44 might however be formed directly in the piston 16, in which case the socket 46 would be omitted.

The engine output shaft 14 is disconnectably connected to the planetary gear's sunwheel 18 by the piston 16 being movable along the engine output shaft and the sunwheel. The piston is thus movable along the splines 42 on the engine output shaft and the sunwheel. The engine output shaft 14, the sunwheel 18 and the movable piston 16 preferably have a common and substantially coinciding axis of rotation 48.

During engine braking, the driver releases the vehicle's accelerator pedal (not depicted). The gearbox input shaft 27 then drives the electrical machine 6 while at the same time the engine and the electrical machine apply engine braking. In this situation, the electrical machine generates electrical energy which is then stored in an on-board battery 50. This operating state is called regenerative braking.

During regenerative braking of the vehicle 1, the planetary gear 10 will cause the electrical machine's regenerative braking torque to be reduced because the engine's braking torque on the sunwheel 18 will not be sufficient. In particular, during powerful regenerative braking by the electrical machine, the sunwheel's speed and hence also the engine's speed will increase undesirably. The present invention solves this by first disconnecting the sunwheel from the engine output shaft and then locking the sunwheel firmly to an element 52 which is firmly connected to the vehicle, so that the sunwheel is prevented from rotating. To achieve this, the piston 16 is shifted and moved along the splines on the engine output shaft and the sunwheel's shaft so that the splines on the piston go out of engagement with those on the engine output shaft. After the engine output shaft has been disconnected from the sunwheel's shaft, the piston is shifted and moved further along the sunwheel's shaft and acts upon a disc clutch 62 which locks the sunwheel firmly to the element 52 which is firmly connected to the vehicle, so that the sunwheel is prevented from rotating. When the sunwheel is stationary and not rotating, the torque is transferred from the gearbox 8 via planet wheel carrier 22 and the planet wheels 28 to the ring gear 20 and the electrical machine 6, which then serves as a generator. When the electrical machine is serving as a generator, it exerts a countertorque to the torque from the gearbox, thereby braking the vehicle, since the gearbox is connected to the powered wheels 12.

The piston 16 is preferably shifted and moved by compressed air supplied through a duct 53 in a housing wall which surrounds the piston. The housing wall takes the form here of the element 52 fastened to the vehicle. The piston is preferably of rotationally symmetrical shape and the compressed air acts upon a peripheral surface of it which forms in conjunction with the element 52 surrounding the piston a space 57 to which the compressed air is led.

To shift and move the piston 16, the engine 4 and the electrical machine 6 are controlled in such a way that a torque-free state is created between the engine output shaft 14 and the planetary gear 10. This involves using a control unit 55 which is also adapted to causing the electrical machine in certain suitable operating situations to use stored electrical energy in order to impart driving force to the gearbox input shaft 27, and in other operating situations to use the kinetic energy of the gearbox input shaft in order to generate and store electrical energy. The control unit 55 therefore monitors the speeds and/or torques of the engine output shaft 14, the gearbox input shaft 27 and the electrical machine's rotor 26 as a basis for controlling the engine and the electrical machine so that a torque-free state is created between the engine output shaft and the planetary gear's sunwheel 18. When the torque-free state is achieved, the piston is shifted and moved by compressed air supplied to the space 57 between the piston and the element 52 through the duct 53 in the element 52.

The control unit 55 is thus adapted to controlling the piston 16 and also to deciding when the electrical machine 6 is to serve as motor and when as generator. To decide this, the control unit may receive current information from suitable operating parameters indicated above. The control unit may be a computer with suitable software for this purpose. The control unit controls also the flow of electrical energy between the battery 50 and the electrical machine's stator 24. At times when the electrical machine serves as motor, stored electrical energy is supplied from the battery to the stator. At times when the electrical machine serves as generator, electrical energy is supplied from the stator to the battery.

The control unit 55 is preferably also connected to a compressed air source 56 which via a line 58 supplies the compressed air to the space 57 via the duct 53. The control unit thus controls the movement of the piston. The control unit is connected to the engine 4, the gearbox 8, the electrical machine 6 and the compressed air source 56 via electrical conductors 60. It is also possible to have a separate control unit for the compressed air source 56.

Figure 3:
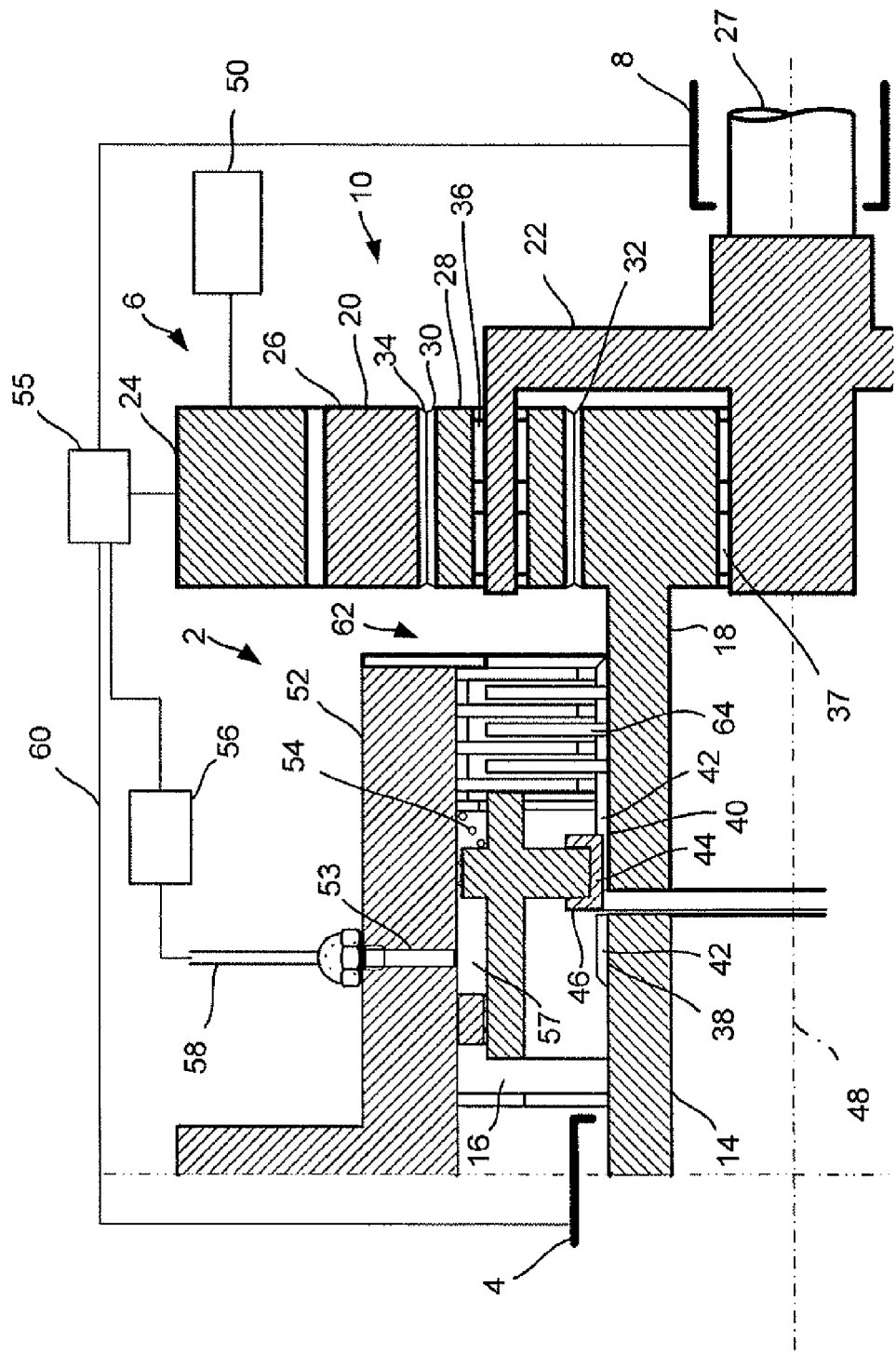
FIG. 3 is a cross-sectional view of the regenerative brake device according to the present invention with a piston in the second position.

FIG. 3 is a cross-sectional view of the regenerative brake device 2 according to the present invention with the piston 16 in a second position. In this second position the engine output shaft 14 and the planetary gear 10 are disconnected from one another by the piston having been shifted and moved along the splines 42 so that the splines 44 on the piston are out of engagement with the splines 42 on the engine output shaft 14. To make this movement of the piston possible, the control unit 55 controls the engine and the electrical machine so that a torque-free state is created between the engine output shaft and the planetary gear's sunwheel, as explained above in relation to FIG. 2.

Figure 4:
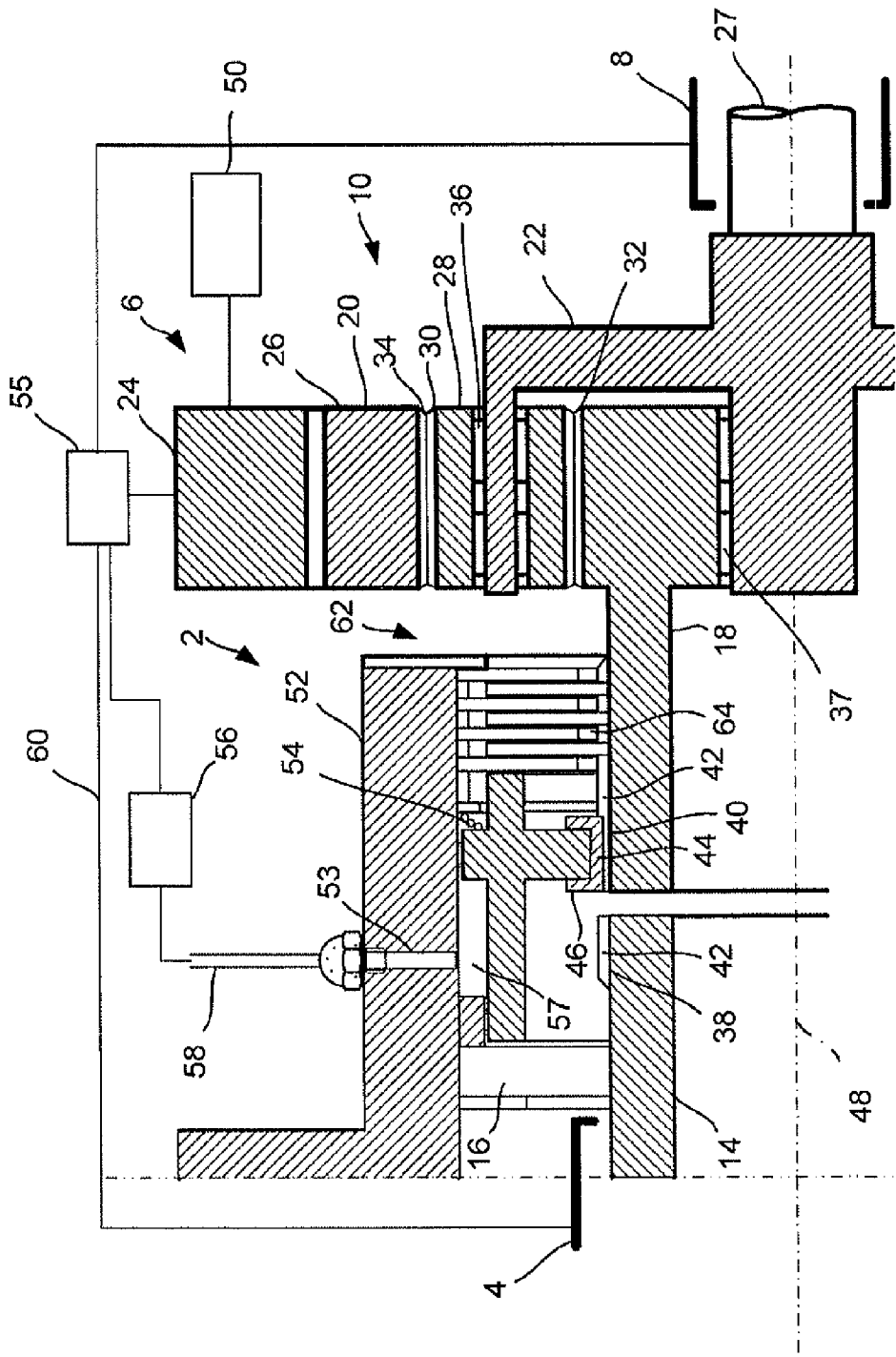
FIG. 4 is a cross-sectional view of the regenerative brake device according to the present invention with a piston in th third position.

FIG. 4 is a cross-sectional view of the regenerative brake device 2 according to the present invention, in which the piston 16 has been moved to a third position in which it acts upon a connecting means in the form of a disc clutch 62 which connects the sunwheel 18 to the element 52 which is fixed relative to the sunwheel. In the third position the engine output shaft 14 and the planetary gear 10 are disconnected from one another. When the discs 64 of the clutch 62 are pressed together by the piston 16, the sunwheel 18 is connected to the element 52 and is thus prevented from rotating. When the sunwheel is stationary and not rotating, the torque is transferred from the gearbox 8 via planet wheel carrier 22 and the planet wheels 28 to the ring gear 20 and the electrical machine 6, which then serves as a generator, as explained above in relation to FIG. 2.

The piston's movement from the first position to the second position and thence to the third position compresses a compression spring 54 situated between the piston and the fixed element 52. The spring 54 is preferably a coil spring which has the function of returning the piston to the first position.

When the vehicle has been braked to desired speed, the regenerative braking is ended by the control unit 55 controlling the compressed air source so that the air pressure decreases and the air in the space 57 between the piston and the element 52 can be evacuated. The compression spring 54 will therefore move the piston out of engagement with the disc clutch 62, with the result that the sunwheel 18 is released from the element 52 and is therefore allowed to rotate. At the same time, the engine and the electrical machine are controlled by the control unit 55 so that a torque-free state is created between the engine output shaft 14 and the sunwheel 18. When the torque-free state has been achieved, the piston is further shifted and moved along the splines 42 by the spring 54, with the result that the splines 44 on the piston enter into engagement with the splines 42 on the engine output shaft. The piston will thus have returned to the first position and the vehicle can be powered by both the engine 4 and the electrical machine 6.

Figure 5:
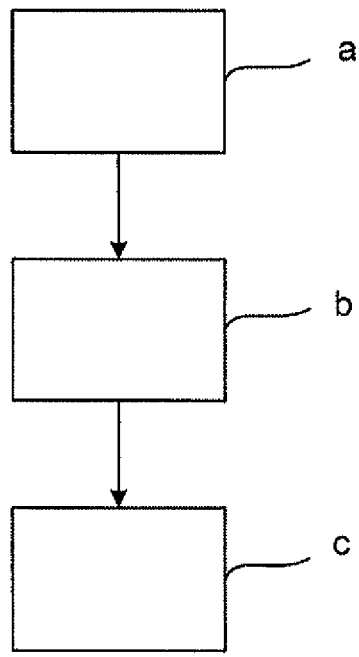
FIG. 5 is a flowchart for a method for regenerative braking of a vehicle with the regenerative brake device according to the present invention.

FIG. 5 is a flowchart for a method for regenerative braking of a vehicle 1 with the regenerative brake device 2 according to the invention. The method according to the invention is characterised by the steps of a) the engine 4 and the electrical machine 6 being controlled so that a torque-free state is created between the engine output shaft 14 and the planetary gear 10, b) the engine output shaft 14 and the planetary gear 10 being disconnected from one another by a movable piston 16 being moved from a first position in which the engine output shaft and the planetary gear are connected together, to a second position in which the engine output shaft and the planetary gear are disconnected, and c) the piston 16 being moved to a third position in which it acts upon a connecting means 62 which connects the planetary gear 10 to an element 52 which is fixed relative to the planetary gear.

Components mentioned and features indicated above may within the scope of the invention be combined between the various embodiments mentioned.

The invention claimed is:

1. A regenerative brake device for a vehicle, the vehicle having a combustion engine with an output shaft and a gearbox with an input shaft, the gearbox being configured for connecting the output shaft with a drive wheel of the vehicle;

the regenerative brake device comprises:
the output shaft of the combustion engine; the input shaft of the gearbox; an electrical machine which comprises a stator and a rotor;

a planetary gear which comprises a sunwheel, a ring gear around the sunwheel and a planet wheel carrier between the sunwheel and the ring gear;

a movable piston between the sunwheel and the ring gear, and located and configured such that the piston causes the engine output shaft to be disconnectably connectable to the planetary gear, the piston being movable to a first position at which the piston connects the engine output shaft to the planetary gear, and the piston being movable to a second position at which the piston disconnects the engine output shaft from the planetary gear;

the engine output shaft is disconnectably connected to the planetary gear's sunwheel, and the sunwheel has a common axis of rotation with the engine output shaft;

the piston is configured as an annular sleeve which in the first position substantially concentrically surrounds a portion of the engine output shaft and a portion of the planetary gear, wherein the portions of the engine output shaft and of the planetary gear include first splines which in the piston's first position cooperate with second splines on the piston to form a splined connection between the piston and the respective portions of the output shaft and the planetary gear, and the piston is movable along the engine output shaft and the planetary gear; and the piston being movable to a third position at which the piston acts upon a connecting device which connects the planetary gear to an element which is fixed relative to the planetary gear.

2. A device according to claim 1, wherein the connecting device is a disc clutch.

3. A device according to claim 1, wherein the engine output shaft and the planetary gear are disconnected from one another in the third position of the piston.

4. A device according to claim 1, further comprising the piston having a surface on which compressed air acts for moving the piston between the positions thereof, and a device configured for supplying the compressed air to the piston surface.

5. A device according to claim 1, wherein the engine output shaft, the electrical machine's rotor and the gearbox input shaft are arranged for rotation about a common axis of rotation.

6. A device according to claim 1, further comprising a control unit configured for controlling the electrical machine so that in first operating situations, the electrical machine uses stored electrical energy to impart driving force to the gearbox input shaft, and in second operating situations, the electrical machine uses kinetic energy of the gearbox input shaft to generate and store electrical energy.

7. A method for regenerative braking of a vehicle, the vehicle having a combustion engine with an output shaft and a gearbox with an input shaft, the gearbox being configured for connecting the output shaft with a device wheel of the vehicle;

the regenerative brake device comprises:

the output shaft of the combustion engine, the input shaft of the gearbox; an electrical machine which comprises a stator and a rotor and;

a planetary gear which comprises a sunwheel, a ring gear around the sunwheel and a planet wheel carrier between the sunwheel and the ring gear;

the method comprising the steps of:

a) controlling the engine and the electrical machine so that a substantially torque-free state is created between the engine output shaft and the planetary gear;

b) then disconnecting the engine output shaft and the planetary gear from one another by moving a movable piston from a first position connecting the engine output shaft and the planetary gear together, to a second position disconnecting the engine output shaft and the planetary gear; and c) and also selectively moving the piston to a third position to act upon a connecting device for selectively connecting the planetary gear to an element which is fixed relative to the planetary gear or disconnecting them by moving the piston out of the third position.

8. A method according to claim 7, further comprising moving the piston by applying compressed air to the piston.

9. A method according to claim 7, further comprising locking the planetary gear firmly by a disc clutch to the element which is fixed relative to the planetary gear.

10. A method according to claim 7, further comprising disconnectably connecting the engine output shaft to the planetary gear's sunwheel.

* * * * *